Nov. 15, 1927.
L. K. DE BUS
MEASURING DEVICE
Filed June 24, 1921
1,648,936
2 Sheets-Sheet 1
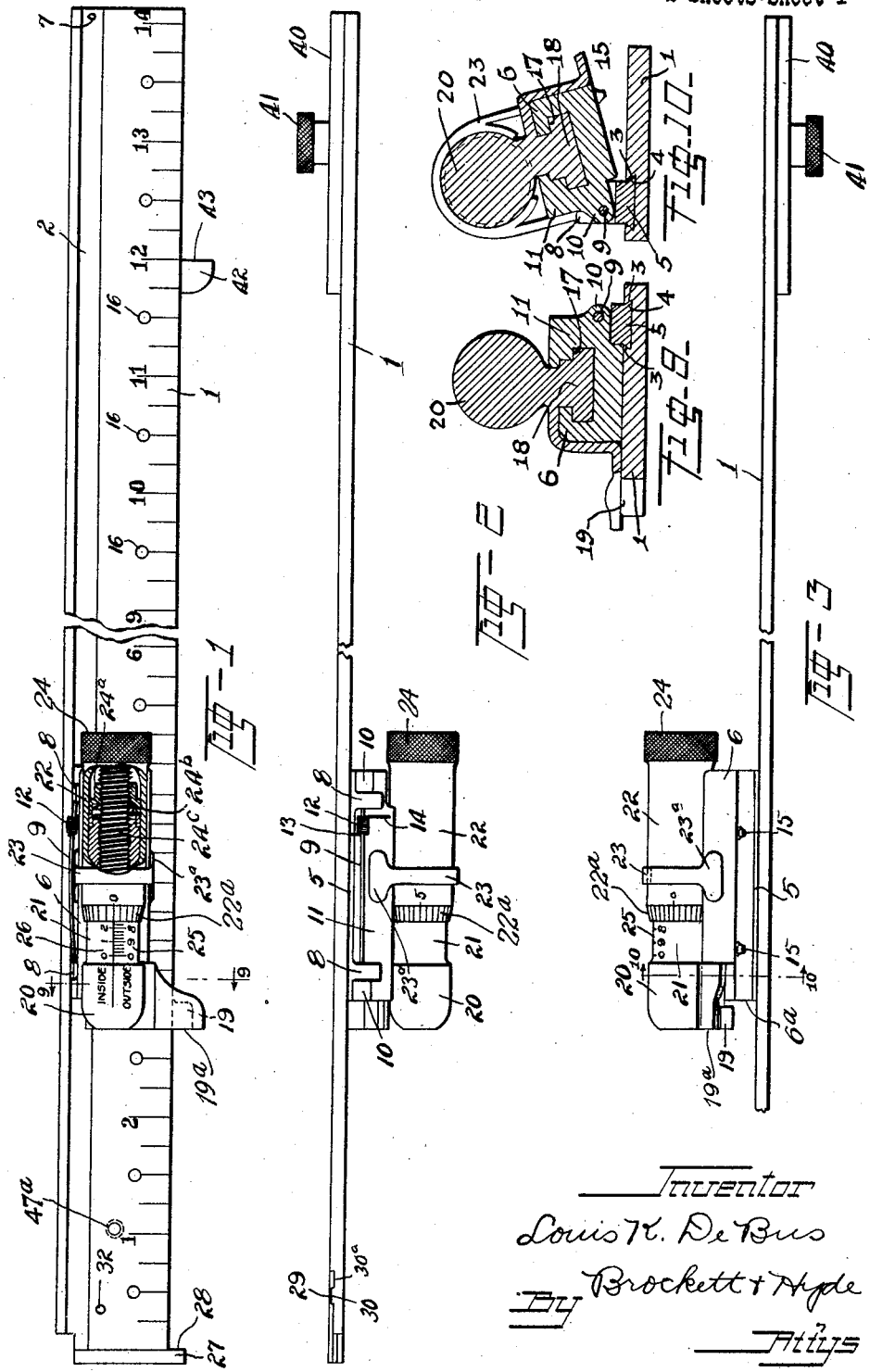

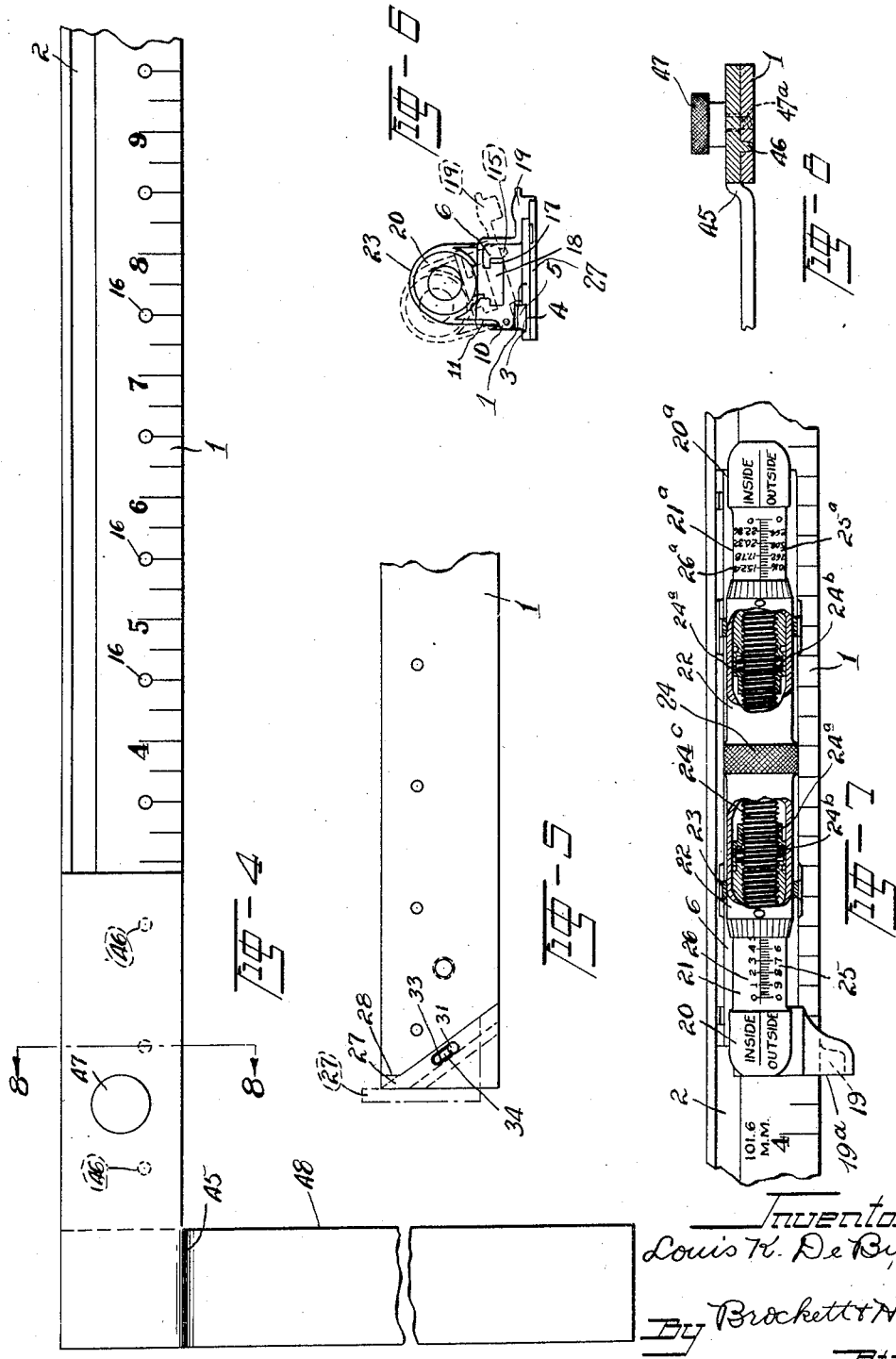

Patented Nov. 15, 1927.

1,648,936

UNITED STATES PATENT OFFICE.

LOUIS K. DE BUS, OF CINCINNATI, OHIO.

MEASURING DEVICE.

Continuation of application Serial No. 465,477, filed April 29, 1921. This application filed June 24, 1921. Serial No. 480,068.

This invention relates to improvements in measuring instruments.

The present invention relates to the same general type of device as shown in my prior Patent No. 1,580,813, granted April 13, 1926, of which the present application is a continuation.

As in the co-pending application above referred to, it is the object of this invention to provide a device in which the coarse measurement is read from the rule itself while the finer measurement, that is the fractional part of the unit of measurement indicated upon the rule, is read from the dial provided upon a carriage which is mounted for sliding movement along the rule.

It is furthermore the object of this invention to provide an improved means of adjusting and setting that part of the device which is used for the finer measurement together with means for facilitating its engagement with the rule and for preventing its accidental displacement therefrom.

Furthermore, it is the object of this invention to provide means by which my device can be employed for making both inside and outside measurements, together with means upon the carriage for indicating the finer graduations corresponding to the inside and outside measurements respectively.

Another object of this invention is to provide an adjustable finger at one end of the rule which can be projected so as to extend out from the rule and serve as a means of facilitating the positioning of the end of the rule in proper alignment with the end of the body which is to be measured.

Another object is to provide a detachable square which can be applied to one end of the rule as a means of further insuring proper alignment of the end of the rule with the edge of the body which is to be measured.

A further object is to provide means whereby this device can be employed for determining measurements in terms of different systems of measurement as for instance in terms of inches and also in terms of millimeters, together with means for indicating upon the carriage the finer measurements of both systems for inside and outside measurements, respectively.

Other objects of this invention will be apparent from the following description and claims when considered in connection with the accompanying drawings.

Fig. 1 is a plan view of one form of my device partly broken away; Fig. 2 is an elevation of my device; Fig. 3 is an elevation showing the carriage in raised position; Fig. 4 is a plan view of a part of the rule with the slidable carriage removed and showing more particularly the detachable square; Fig. 5 is an inverted plan view of one end portion of the rule showing the adjustable finger; Fig. 6 is an end elevation of the rule showing the rockable carriage in raised and lowered positions; Fig. 7 is a plan view of a modification in which provision is made for measurements in terms of both inches and millimeters, this view being partly broken away; Fig. 8 is a section on line 8—8, Fig. 4; and Figs. 9 and 10 are cross-sectional views respectively on the lines 9—9, Fig. 1 and lines 10—10, Fig. 3.

The rule 1 has indicated thereupon the inches and quarter inches and is provided with the groove 2 extending throughout the length thereof along its rear portion. The walls of the groove 2 are undercut as indicated at 3, Fig. 6, for slidable engagement with the beveled edges 4 of the slide member 5 of a carriage 6, said carriage being rockably mounted upon said slide member. The stop 7 is provided upon the bottom of the groove 2 at one end portion thereof and similar provision may be made at the other end of the groove for the purpose of preventing accidental removal of the carriage from the rule.

The slide member 5 has the upstanding lugs 8 through which extends a pintle or hinge rod 9, the extreme ends of which are fixed in the lugs 10 provided upon the rockable carriage 6. This structure constitutes a hinge between the rockable carriage 6 and the slide member 5, and the upstanding members 8 constitute a stop means against which the rear wall 11 of the rockable carriage 6 engages so as to limit the extent to which said carriage can be rocked about its hinge in moving away from the rule 1. A spring 12 is coiled about the pintle rod 9 and has its ends 13 and 14 engaging the slidable member 5 and the wall 11, respectively, so as to tend to force the rockable carriage 6 into engagement with the rule 1, and to also prevent said carriage from sliding or slipping off the rule when the slightly tapered pins 15 on the under face of said carriage (Fig. 3) are not engaged in apertures 16 (Fig. 1) provided along the rule. These pins and apertures are so spaced that when in engagement, the forward edge 6ª of the carriage 6 will be in register or alignment with an inch mark on the rule. As indicated in the drawings, the carriage 6 is confined within the lateral limitations or dimensions of the rule 1, with the result that the measuring device as a whole is exceedingly compact and therefore capable of use in places where there would not be sufficient space for the use of a device with carriage parts projecting beyond the lateral limits of the rule.

The carriage 6 is provided with an inverted T-shaped groove or channel 17 for slidable engagement with the correspondingly formed member 18. Extending forwardly and downwardly from the front of the top portion of the member 18 is the finger 19 which has engagement with the front edge of the rule 1 for contact with one end of the body to be measured as will later appear. The slidable member 18 supports the barrel member 20 which has the reduced cylindrical sleeve 21 for telescopic engagement with a thimble or drum 22 said thimble being mounted for rotatable movement in a collar 23 on bracket 23ª supported upon the carriage 6. The collar 23, within which the thimble 22 rotates and which is held in fixed position upon the carriage 6, permits only rotative movement of the thimble 22 and bears substantially the same relation thereto as in the Slocomb micrometer gage which is old and well known. In fact, the structure and arrangement of the members 20, 21, 22 and 23, where shown, are the same as in the Slocomb structure just now referred to. Briefly stated, this structure comprises thimble 22 which has the screw 24ᶜ fixed at one end within and at the knurled end 24 of the thimble, the other or free end of the screw engaging the inside screw threads of the sleeve 21, whereby rotative movement of the thimble 22 by means of the knurled head 24 will cause sliding movement of the sleeve 21 together with the finger 19 along the rule. The threaded ring 24ª and coiled spring 24ᵇ constitute a means for taking up wear of the threads of the screw 24ᶜ, said result being accomplished by screwing up said ring against the tension of said spring. The threads of said screw are of such pitch that the numbers at 25 and 26 represent tenths of an inch. The smaller graduations represent one fourth of one tenth, that is, one fortieth or .025 of an inch. One rotation of the thimble corresponds to .025 of an inch and hence one of the twenty-five sub-divisions on member 21. The beveled end 22ª of the thimble is provided with graduations corresponding to one thousandth of an inch. The scale 25 is read for an outside measurement. When an inside measurement is made, the scale 26 is read. These two scales are easily identified by means of the words "Inside" and "Outside" as clearly shown in the drawings.

The finger 27 is mounted upon the underface of one end portion of the rule 1 so as to be slidable in a diagonal direction into and out of extended position as indicated in Fig. 1. The edge 28 of said finger is adapted to engage one end of the body to be measured and it should be noted that said edge 28 is in alignment with the extreme end of the rule. The base portion of this finger is provided with the groove 29 which has slidable engagement with the rib 30 formed on the underface of the cutout portion 30ª, the head 31 of a pin 32 fixed to the rule 1 engaging the shoulder 33, and adapted for sliding movement in the slot 34. As shown in the drawings, the finger 27 when in retracted or inoperative position has its front and rear edges in alignment with the front and rear edges of the rule, while the end of the base portion of the finger forms the end edge of the rule, as indicated in full lines, Fig. 5.

At the other end of the rule there is provided a plate 40 which is removably attached to the rule by a clamping screw 41 which is adapted to engage in the registering apertures 16 in the plate 40 and the rule 1, the apertures in the latter being threaded. This plate has a finger 42 which is offset upwardly so as to have the portion bearing the straight edge 43 in substantial alignment with the front edge of the rule and flush with the underface thereof. The edge 43 cooperates with the edge of the finger 19 in making the inside measurements, as for instance the inside diameter of a tubular member. The straight edge 19ª of the finger 19 is used to co-operate with the straight edge 28 of finger 27 when an outside measurement is taken, as for instance the outside diameter of a tubular member.

I have provided also a square, the two angles or arms of which are offset, as indicated at 45, the one arm thereof being provided with slightly tapering pins 46 for registering engagement with the holes 16 in the rule 1. A set screw 47 engages registering apertures in the square and the rule for clamping the square in position upon the rule, the aperture of the latter being threaded as at 47ª. This square is adapted to be placed upon the end of the rule so as to have the straight edge 48 thereof in alignment with the extreme end of the rule in the same way as above described in connection with the straight edge 28 of the finger 27.

In the form illustrated in Fig. 7, I have extended rearwardly the screw 24ᶜ of the thimble 22 and have provided another sleeve 21ª which is screw threaded on its interior for engagement with said thimble screw. The sleeve 21ª is also provided with a large end portion 20ª mounted upon a slidable member of the same form as the member 18 and which has like slidable engagement in the groove 17. The threads on the two end portions of the screw within the thimble 22 are right-hand so that upon rotation of the knurled head 24, the barrels 21 and 21ª will move in the same direction and at the same rate, and like means is provided for taking up wear of the threads of the screw, as before mentioned.

The sleeve 21ª is provided with indications of millimeters both for inside and outside measurements, as indicated at 25ª and 26ª, respectively, and the right hand beveled end of the thimble 22 is also provided with further graduations for reading small parts of a millimeter. One inch is equal to 25.4 m. m. which are read from the sleeve. Each of the smallest subdivisions on the sleeve corresponds to .635 m. m. or one rotation of the thimble. Each of the twenty-five subdivisions on the thimble corresponds to .0254 m. m. The aggregate number of millimeters read from the rule and the micrometer attachment represents the exact measurement. Thus I am enabled to determine a measurement either inside or outside and to read the same in terms of inches or in terms of millimeters by a single operation. It is to be understood of course that other systems of measurement might be adopted, if so desired.

The advantages resulting from this invention will be apparent to those who are familiar with the art to which it relates.

What I claim is:

1. A measuring device, comprising a rule with units of measurement indicated thereon, a carriage, means whereby said carriage is slidably and rockably mounted upon said rule, said carriage being adapted to be set at points indicating full units of measurement along said rule and being confined substantially within the lateral dimensions of said rule, means for normally forcing said carriage into engagement with said rule, a work engaging finger movably mounted upon said carriage for slidable movement along said rule, and means working in conjunction with such movement of said finger for indicating fractional parts of a unit of measurement.

2. A measuring device, comprising a rule with units of measurement indicated thereon, a carriage, means whereby said carriage is slidably mounted upon said rule, said carriage being adapted to be set at points indicating full units of measurement along said rule, said carriage being confined substantially within the lateral dimensions of said rule, telescoping members mounted upon said carriage, one of said members having a work engaging finger for movement along said rule, and means working in conjunction with such movement of said finger for indicating fractional parts of a unit of measurement.

3. A measuring device, comprising a rule with units of measurement indicated thereon, a carriage, means whereby said carriage is slidably mounted upon said rule, said carriage being adapted to be set at points indicating full units of measurement along said rule, said carriage being confined substantially within the lateral dimensions of said rule, telescoping members mounted upon said carriage and being capable of relative movement lengthwise of said rule, a work engaging finger carried by one of said members, the other of said members being capable of rotary movement for effecting movement of said carriage along said rule, and means working in conjunction with such movement of said finger for indicating fractional parts of a unit of measurement.

4. A measuring device, comprising a rule with units of measurement indicated thereon, a carriage, means whereby said carriage is rockably mounted upon said rule, said carriage being adapted to be set at points indicating full units of measurement along said rule, said carriage being confined substantially within the lateral dimensions of said rule, means for limiting the rocking movement of said carriage, means for normally forcing said carriage into engagement with said rule, a work engaging finger movably mounted upon said carriage for slidable movement along said rule, and means working in conjunction with such movement of said finger for indicating fractional parts of a unit of measurement.

5. A measuring device, comprising a rule with units of measurement indicated thereon, a carriage, means whereby said carriage is slidably mounted upon said rule, said carriage being adapted to be set at points indicating full units of measurement along said rule, said carriage being confined substantially within the lateral dimensions of said rule, relatively movable members mounted upon said carriage, one of said members having a work engaging finger for movement therewith along said rule, a second finger upon said rule for cooperation with and facing away from said first finger for inside measurements, and means working in conjunction with such movement of said first finger for indicating fractional parts of a unit of measurement, the indication of said fractional parts relating to an inside measurement.

6. A measuring device, comprising a rule with units of measurement indicated thereon, a carriage, means whereby said carriage is slidably mounted upon said rule, said carriage being adapted to be set at points indicating full units of measurement along said rule, said carriage being confined substantially within the lateral dimensions of said rule, relatively movable members mounted upon said carriage, one of said members having a work engaging finger for movement therewith along said rule, a second finger upon said rule for cooperation with and facing said first finger for outside measurements, and means working in conjunction with such movement of said finger for indicating fractional parts of a unit of measurement, the indications of said fractional parts relating to an outside measurement.

7. A measuring device, comprising a rule with units of measurement indicated thereon, a carriage, means whereby said carriage is slidably mounted upon said rule, said carriage being adapted to be set at points indicating full units of measurement along said rule, relatively movable members mounted upon said carriage, one of said members having a work engaging finger for movement therewith along said rule, a second finger upon said rule for cooperation with and facing said first finger for outside measurements, a third finger upon said rule for cooperation with and facing away from said first finger for inside measurements, and means working in conjunction with such movement of said first finger for indicating fractional parts of a unit of measurement for either an inside or an outside measurement.

8. A measuring device, comprising a rule with units of different systems of measurement indicated thereon, a carriage, means whereby said carriage is slidably mounted upon said rule, said carriage being adapted to be set at points indicating full units of measurement along said rule, relatively movable members mounted upon said carriage, one of said members having a work engaging finger for movement therewith along said rule, and means working in conjunction with such movement of said finger for indicating fractional parts of units of each of said systems of measurement.

9. A measuring device, comprising a rule with units of different systems of measurement indicated thereon, a carriage, means whereby said carriage is slidably mounted upon said rule, said carriage being adapted to be set at points indicating full units of measurement along said rule, relatively movable members mounted upon said carriage, one of said members having a work engaging finger for movement therewith along said rule, a second finger upon said rule for cooperation with and facing away from said first finger for inside measurement, and means working in conjunction with such movement of said first finger for indicating fractional parts of units for each of said systems of measurement, the indications of said fractional parts relating to an inside measurement.

10. A measuring device, comprising a rule with units of different systems of measurement indicated thereon, a carriage, means whereby said carriage is slidably mounted upon said rule, said carriage being adapted to be set at points indicating full units of measurement along said rule, relatively movable members mounted upon said carriage, one of said members having a work engaging finger for movement therewith along said rule, a second finger upon said rule for cooperation with and facing said first finger for outside measurements, and means working in conjunction with such movement of said first finger for indicating fractional parts of units of each of said systems of measurement, the indications of said fractional parts relating to an outside measurement.

11. A measuring device, comprising a rule with units of different systems of measurement indicated thereon, a carriage, means whereby said carriage is slidably mounted upon said rule, said carriage being adapted to be set at points indicating full units of measurement along said rule, relatively movable members mounted upon said carriage, one of said members having a work engaging finger for movement therewith along said rule, a second finger upon said rule for cooperation with and facing said first finger for outside measurements, a third finger upon said rule for cooperation with and facing away from said first finger for inside measurements, and means working in conjunction with such movement of said first finger for indicating fractional parts of units of each of said systems of measurement, the indications of said fractional parts relating to both inside and outside measurements.

12. A measuring device, comprising a rule with indications of measurement thereon, a slidable finger having a straight edge portion for cooperation with said indications, and means for mounting said finger upon an end portion of said rule so that it may be moved diagonally across said end portion and yet maintain at all times the straight edge portion of said finger at right angles to the front edge portion of said rule.

13. A measuring device, comprising a rule with indications of measurement thereon, a slidable finger having a straight edge portion for cooperation with said indications, and pin and slot means for mounting said finger upon an end portion of said rule so that it may be moved diagonally across said end portion and yet maintain at all times the straight edge portion of said finger at right angles to the front edge portion of said rule.

14. A measuring device, comprising a rule with indications of measurement thereon, a slidable finger having a straight edge portion for cooperation with said indications, and means for mounting said finger upon an end portion of said rule so that it may be moved diagonally across said end portion into and out of projecting position and yet maintain at all times the straight edge portion of said finger at substantially right angles to the front edge portion of said rule.

15. A measuring device, comprising a rule with indications of measurement thereon, a finger adapted to project from an end of said rule and having a straight edge portion for cooperation with said indications, said straight edge portion being at right angles to the front edge portion of said rule and being adapted to register with the edge portion of said rule end, one of the faces of said rule end being provided with a cut-out portion forming a recess, and means for slidably mounting said finger in said recess so that it may be moved diagonally across said end portion, said finger lying flush with said rule surface.

In testimony whereof I hereby affix my signature.

LOUIS K. DE BUS.